Figure 1:
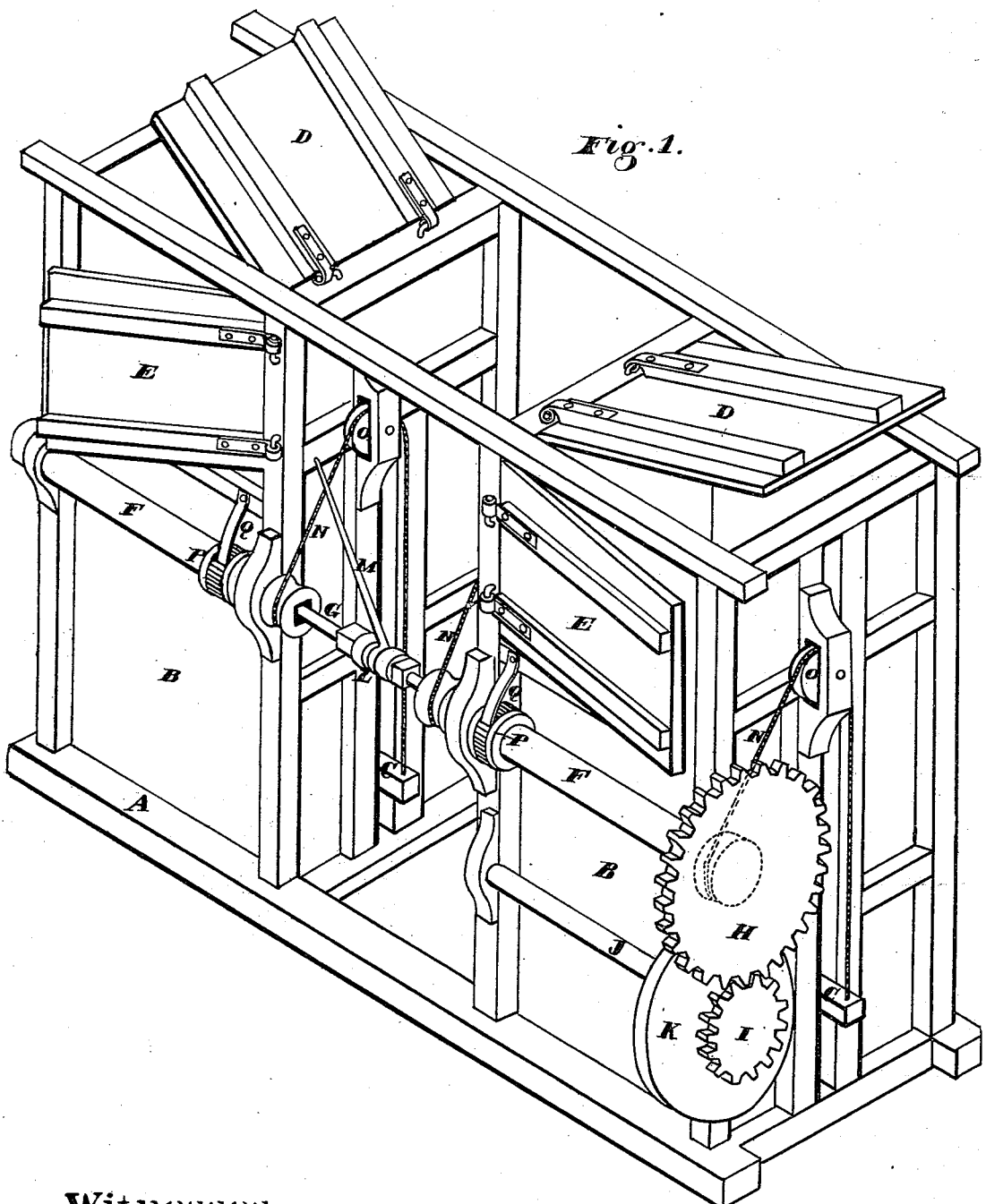

D. L. O'CONNOR.
Baling-Press

No. 167,268.

Patented Aug. 31, 1875.

Witnesses
Geo. H. Strong.
C. M. Richardson

Inventor
D. L. O'Connor
By his Atty's
Dewey & Co.

UNITED STATES PATENT OFFICE.

DEMING L. O'CONNOR, OF COVELO, CALIFORNIA.

IMPROVEMENT IN BALING-PRESSES.

Specification forming part of Letters Patent No. 167,268, dated August 31, 1875; application filed June 29, 1875.

*To all whom it may concern:*

Be it known that I, DEMING L. O'CONNOR, of Covelo, Mendocino county, State of California, have invented a Baling-Press; and I do hereby declare the following description and accompanying drawings are sufficient to enable any person skilled in the art or science to which it most nearly appertains to make and use my said invention without further invention or experiment.

My invention relates to certain improvements in baling-presses; and it consists, principally, in the construction of two or more distinct compartments, which are placed side by side upon the same base or frame, and have a common driving-shaft extending through loosely-mounted actuating-drums, so that by means of a suitable clutch either one or the other may be operated.

The devices for communicating the power to the two followers are not especially novel, and will be more fully described in the following specification, reference being made to the accompanying drawing.

Figure 1 is a perspective view of my press.

A is a base or frame, which may be mounted upon wheels for greater ease in transportation. Upon this frame are mounted two or more upright compartments, B B, having the followers C, which work upwardly by means of mechanism to be hereafter described. At the top of each compartment is a feeding-door, D, and doors E serve as discharge-openings for the finished bale. These doors are secured by any of the usual methods, and the compartments are filled alternately by means of a derrick, which can be mounted upon the top beams, or they may be filled by hand. In order to operate my baling-press, so that the different compartments will be filled and pressed in regular succession, I mount the drums F F upon the sides of the compartments, so that they will be in an exact line. These drums are journaled to turn in suitable boxes, and are made hollow, so as to admit the stout shaft G, which extends through the whole length of both drums, turning loosely within them. Upon one end of this shaft is secured the toothed wheel H, which is driven by a pinion, I, mounted upon the shaft J. The belt or rope wheel K serves to transmit either steam or horse power to the shaft, and thus drive it. The shaft G has a clutch-coupling, L, of any desired form, mounted in its center, so as to rotate with it. By means of a lever, M, this coupling may be moved, so as to engage with either of the drums F F, and cause it to rotate; or it may be left midway between them whenever it is desired to stop all work. From the drums F F chains N pass over the pulleys O upon the ends of the press, and thence they are led to the projecting arms of the followers, either with or without the intervention of other pulleys for increasing power, as may be desired. By this construction I am enabled to work my press alternately with only one set of machinery, thus greatly increasing the production.

If desired, the pinion I may be mounted upon a feather, so that it can be shifted out of gear at will.

Ratchet-wheels P are secured to each drum, and pawls Q hold them, so that the followers will keep the bales to their places until the tying is complete, after which they may be released.

Having thus described my invention, what I claim, and desire to secure by Letters Patent, is—

1. The compartments B, followers C, chains N, pulleys O, and operating-drums F, in combination with the shaft G, with its clutch-coupling L and the driving mechanism, as shown, the whole constructed to operate substantially as herein described.

2. In combination with the shaft G, with its clutch L, and the independent rotating drums F, the ratchet-wheels P and pawls Q, substantially as and for the purpose herein described.

In witness whereof I hereunto set my hand and seal.

DEMING L. O'CONNOR. [L. S.]

Witnesses:
GEO. H. STRONG,
C. M. RICHARDSON.